United States Patent
Hoover et al.

(10) Patent No.: US 11,465,751 B2
(45) Date of Patent: Oct. 11, 2022

(54) VEHICLE SEAT ARMREST ASSEMBLY WITH REPOSITIONABLE ARM PAD

(71) Applicant: AMI Industries, Inc., Colorado Springs, CO (US)

(72) Inventors: Douglas E. Hoover, Colorado Springs, CO (US); David A. Ross, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 154 days.

(21) Appl. No.: 17/135,633

(22) Filed: Dec. 28, 2020

(65) Prior Publication Data

US 2022/0204166 A1    Jun. 30, 2022

(51) Int. Cl.
*B64D 11/06* (2006.01)

(52) U.S. Cl.
CPC ...... *B64D 11/0644* (2014.12); *B64D 11/0646* (2014.12); *B64D 11/0689* (2013.01)

(58) Field of Classification Search
CPC ............ B64D 11/0644; B64D 11/0689; B64D 11/0646; B60N 2/763; B60N 2/767; B60N 2/77; B60N 2/777; G05G 1/62
See application file for complete search history.

(56) References Cited

U.S. PATENT DOCUMENTS

| | | | |
|---|---|---|---|
| 3,926,473 A | 12/1975 | Hogan | |
| 4,938,439 A | 7/1990 | Fried et al. | |
| 5,104,191 A | 4/1992 | Tame | |
| 10,137,990 B2 | 11/2018 | Lee et al. | |
| 10,486,568 B2* | 11/2019 | Davis | B60N 2/797 |
| 10,882,427 B2* | 1/2021 | Davis | B60N 2/757 |
| 10,953,778 B2* | 3/2021 | Page | B60N 2/12 |
| 2009/0315381 A1* | 12/2009 | Longnecker | B64D 11/0647 |
| | | | 297/411.23 |

(Continued)

FOREIGN PATENT DOCUMENTS

| | | |
|---|---|---|
| CM | 203637835 U | 6/2014 |
| CN | 108501783 A | 9/2018 |

(Continued)

OTHER PUBLICATIONS

Extended Search Report in European Application No. 21217546.7 dated May 24, 2022, 7 pages.

*Primary Examiner* — Richard R. Green
*Assistant Examiner* — Madison Elizabeth Dittner
(74) *Attorney, Agent, or Firm* — Suiter Swantz pc llo (57) ABSTRACT

Disclosed is an armrest assembly for a vehicle seat such as a pilot seat positioned in an aircraft cockpit. The armrest assembly generally includes a pivoting armrest and an arm pad repositionable relative to the armrest to change the arm pad width. The arm pad includes two functional sides each having a different width dimension. The arm pad is coupled to the armrest such that sequential translational and rotational motion of the arm pad moves one of the first and second sides into a use position atop the armrest and the other of the first and second sides into an out of use position alongside the armrest. The armrest assembly according to the present disclosure is ideal for use in tight quarters within the flight deck, among other installation environments requiring a functional armrest.

15 Claims, 10 Drawing Sheets

(56) References Cited

U.S. PATENT DOCUMENTS

| | | | | |
|---|---|---|---|---|
| 2016/0101867 A1* | 4/2016 | McLaughlin | ...... | B64D 11/0689 |
| | | | | 297/411.35 |
| 2019/0351799 A1 | 11/2019 | Kim et al. | | |
| 2021/0331804 A1* | 10/2021 | Frost | ................. | B64D 11/0638 |

FOREIGN PATENT DOCUMENTS

| | | |
|---|---|---|
| CN | 109591838 A | 4/2019 |
| CN | 110171337 A | 8/2019 |
| CN | 209202507 U | 8/2019 |
| CN | 110884401 A | 3/2020 |
| EP | 2698276 B1 | 5/2015 |
| JP | 2007190162 A | 8/2007 |
| KR | 101241856 B1 | 3/2013 |
| KR | 102151953 B1 | 9/2020 |

\* cited by examiner

VEHICLE SEAT ARMREST ASSEMBLY WITH REPOSITIONABLE ARM PAD

TECHNICAL FIELD

The subject matter disclosed herein relates generally to vehicle seat armrests and more particularly to an armrest assembly including a repositionable arm pad for providing an ergonomically functional armrest for a vehicle seat positioned within a confined space, for instance an aircraft pilot seat positioned within a cockpit.

BACKGROUND

Vehicle seats generally include armrests for providing comfort to the seat occupant. Armrests can be mounted to the seat frame, seat backrest, or to monuments positioned alongside the vehicle seat. Some armrest may be positionally fixed while other armrests may be movable between stowed and deployed positions.

Certain vehicle seats such as passenger seats are typically sufficiently spaced from other seats, walls and monuments to allow a variety of different armrest configurations to be utilized. Other vehicle seats, such as aircraft pilot seats, are commonly positioned in tight quarters within the cockpit. In many cockpit configurations pilot seats are positioned in close proximity to inboard and outboard consoles thereby providing a minimal amount of space between the seat and the consoles for positioning a functional armrest. This is especially true on the outboard side of a pilot seat where the outboard console may taper inward closing off the space where a functioning armrest would typically reside.

Therefore, what is needed is a functioning armrest assembly configured for use with vehicle seats positioned in confined spaces.

BRIEF SUMMARY

To achieve the foregoing and other advantages, in a first embodiment the present disclosure provides a vehicle seat armrest assembly generally including an armrest and an arm pad repositionable relative to the armrest to change the arm pad ergonomics. In some embodiments, the armrest has a top, a bottom, an inboard side, and an outboard side. Spaced first and second guide tracks are provided along the outboard side and first and second guides are slidably engaged in the respective first and second guide tracks. The arm pad attaches to the first and second guides. The arm pad has contiguous first and second sides, wherein the arm pad is repositionable relative to the armrest between a first position in which the first side is positioned on the top of the armrest and the second side is positioned alongside the outboard side of the armrest, and a second position in which the first side is positioned alongside the inboard side of the armrest and the second side is positioned on the top of the armrest.

In some embodiments, the contiguous first and second sides of the arm pad form an angle of approximately 90 degrees.

In some embodiments, a width of the second side of the arm pad is greater than a width of the first side of the arm pad such that the arm pad, when the armrest is deployed, is movable from the first position to the second position to change the arm pad ergonomics.

In some embodiments, each of the first and second guide tracks may be defined in, for instance formed in, the outboard side of the armrest, and each of the first and second guide tracks may be linear and may have a length approximately equal to a height of the armrest.

In some embodiments, the armrest assembly further includes a first guide keeper positioned at an upper end of the first guide track to retain the first guide in the first guide track, and a second guide keeper positioned at an upper end of the second guide track to retain the second guide in the second guide track, each of the first and second guide keepers allowing their respective retained one of the first and second guides to rotate within its respective one of the first and second guide tracks when positioned at the upper end of their respective one of the first and second guide tracks.

In some embodiments, each of the first and second guides includes a first end attached to an inner face of the second side of the arm pad, a second end including a bar slidable along a length of the respective one of the first and second guide tracks, and a middle portion extending through a face of the outboard side of the armrest. In some embodiments, each of the first and second guides is rotatable within their respective one of the first and second guide tracks when the respective guide is positioned at an upper end of its respective one of the first and second guide tracks.

In some embodiments, movement of the arm pad from the first position to the second position requires arm pad vertical translation followed by rotation in sequential order, and movement of the arm pad from the second position to the first position requires arm pad rotation followed by vertical translation in sequential order, wherein the translational and rotational motions are purely manual.

In some embodiments, the first and second sides of the arm pad are integrally formed, and the arm pad includes a rigid structural base layer, a cushion layer positioned atop the rigid structural base layer, and a wrapping layer covering the cushion layer.

In some embodiments, the armrest assembly further includes a fixed arm pad separate from the repositionable arm pad, the fixed arm pad positioned rearward of the repositionable arm pad along the length of the armrest.

In another aspect, the present disclosure provides an aircraft cockpit configuration including a console and a pilot seat positioned to one side of the console, the pilot seat including a backrest and an armrest assembly pivotable between a stowed position alongside the backrest and a deployed position in a space provided between the pilot seat and the console. In some embodiments, the armrest assembly includes an armrest and a repositionable arm pad movably coupled to the armrest. The armrest has a top, a bottom, an inboard side, an outboard side, and spaced first and second guide tracks provided along the outboard side, wherein the inboard side faces the pilot seat and the outboard side faces the console. First and second guides are slidably engaged in the respective first and second guide tracks. The arm pad is attached to the first and second guides. The arm pad has contiguous first and second sides such that when the armrest assembly is in the deployed position the arm pad is repositionable relative to the armrest between a first position in which the first side is positioned on the top of the armrest and the second side is positioned alongside the outboard side of the armrest, and a second position in which the first side is positioned alongside the inboard side of the armrest and the second side is positioned on the top of the armrest. In some embodiments, the second side is wider than the first side such that that first arm pad position provides a narrow armrest and the second arm pad position provides a wide armrest.

In some embodiments, when the arm pad is in the first position the first side of the arm pad is horizontal, the second side of the arm pad is vertical, and the first side of the arm pad rests on the top of the armrest, and when the arm pad is in the second position the first side of the arm pad is vertical, the second side of the arm pad is horizontal, and the second side of the arm pad rests on the top of the armrest.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure describes armrest assemblies configured for use with vehicle seats and vehicle seats such as pilot seats including functional armrest assemblies.

With reference to FIGS. 1A-D, a vehicle seat armrest assembly according to the present disclosure is indicated at reference numeral 100 and generally includes an armrest 102 and an arm pad 104 which is repositionable relative to the armrest 102. The armrest 102 may be configured for attachment at one end to a vehicle seat element such as a seat frame or backrest, and may be pivotably attached to the seat element for rotational movement between a stowed position in which the armrest is generally vertical and a deployed position in which the armrest is generally horizontal. In some embodiments, the armrest may stow in a recess formed in the backrest. Although a single armrest assembly 100 is described herein and shown implemented as a left armrest, it is envisioned and intended that a vehicle seat may include a right armrest, or like left and right armrest assemblies symmetrically arranged on opposing sides of the vehicle seat.

The armrest 102 is an elongate structural member constructed from one or more parts generally forming an armrest top 106, armrest bottom 108, armrest inboard side 110, and armrest outboard side 112. As used herein, the term "inboard side" refers to the armrest side facing the vehicle seat and the term "outboard side" refers to the armrest side facing away from the vehicle seat, for instance facing a console positioned alongside the vehicle seat in an aircraft cockpit.

Spaced first and second guide tracks 114a, 114b are provided along the armrest outboard side 112 and function to guide movement of the arm pad 104 between first and second arm pad positions as discussed further below. Each of the first and second guide tracks 114a, 114b may be defined in, formed by, or incorporated into the armrest outboard side 112. As shown, the first guide track 114a is positioned proximate the forward end of the armrest 102 and the second guide track 114b is positioned about mid-span along the length of the armrest 102. The number of guide tracks, their respective spacing, and their respective position may be customized based on the armrest and/or arm pad configuration.

Each of the first and second guide tracks 114a, 114b is linear and extends substantially the height of the armrest 102. In some embodiments, each of the first and second guide tracks 114a, 114b may be T-shaped. First and second guide keepers 116a, 116b are positioned at the top of the respective first and second guide tracks 114a, 114b and function to maintain respective first and second guides 118a, 118b in their respective track and provide a contact stop for the guides. Each of the first and second guide keepers 116a, 116b may be constructed as a plate which secures to the armrest top 106 using one or more fasteners 120, for instance externally threaded screws received in internally threaded openings in the armrest top 106. As shown, each of the first and second guide keepers 116a, 116b has a notch which aligns with its guide track to allow its contained guide to rotate approximately 90 degrees upon contacting the guide keeper in order to transition the arm pad 104 from the first position to the second position or vice versa as discussed further below.

Each of the first and second guides 118a, 118b interacts with its respective guide track and movably couples the arm pad 104 to the armrest 102. As shown, each guide 118a, 118b has a first end 122a, 122b configured to attach to the arm pad 104, for instance to the inner face of the arm pad, a second end 124a, 124b forming a bar slidable along the length of its respective guide track 114a, 114b, and a middle portion 126a, 126b which extends through the face of the armrest outboard side 112. Each guide 118a, 118b is configured to translate vertically along the length of its respective slot, and upon contacting its guide keeper 116a, 116b at the upper extent of travel, rotate approximately 90 degrees within its guide track to rotate the arm pad 104 to reposition the arm pad relative to the armrest 102.

In some embodiments, the arm pad 104 is generally elongate and includes contiguous first and second sides 128, 130 forming an angle of approximately 90 degrees. In some embodiments, the arm pad 104 may further include a front end 132 contiguous with and perpendicular to each of the first side 128 and the second side 130. As shown, the first and second sides 128, 130 have equal lengths but different widths such that the armrest surface area can be changed by selectively positioning the first side 128 atop the armrest to provide a first arm pad position (e.g., see FIG. 2A), or by positioning the second side 130 atop the armrest to provide a second arm pad position (e.g., see FIG. 2E). In some embodiments, the first arm pad position corresponds to a stowed arm pad condition and the second arm pad position corresponds to a deployed arm pad condition. In other embodiments, both arm pad positions may correspond to deployed arm pad conditions wherein the second arm pad position provides a wider, and therefore more ergonomic armrest, as compared to the first arm pad position. In a particular embodiment, the width of the first side 128 may be approximately 1 inch or 2.5 cm, and the width of the second side may be approximately 2 inches or 5 cm. Other width dimensions and ratios are possible and envisioned depending on available space, preference, etc.

With reference to FIGS. 2A-F, the armrest assembly 100 is shown deployed into the space between a vehicle seat 134 and a console 136, for instance a pilot seat and an outboard console positioned in an aircraft cockpit. With specific reference to FIGS. 2A and 2B, the arm pad 104 is shown in the first position in which the arm pad first side 128 is positioned on the armrest top 106 and horizontal, and the arm pad second side 130 is positioned alongside the armrest outboard side 112, in close proximity thereto, and vertical. In the first arm pad position, the bottom surface of the first side 128 may seat directly on the armrest top 106 to provide surface contact support for the arm pad 104.

Figure 1A:
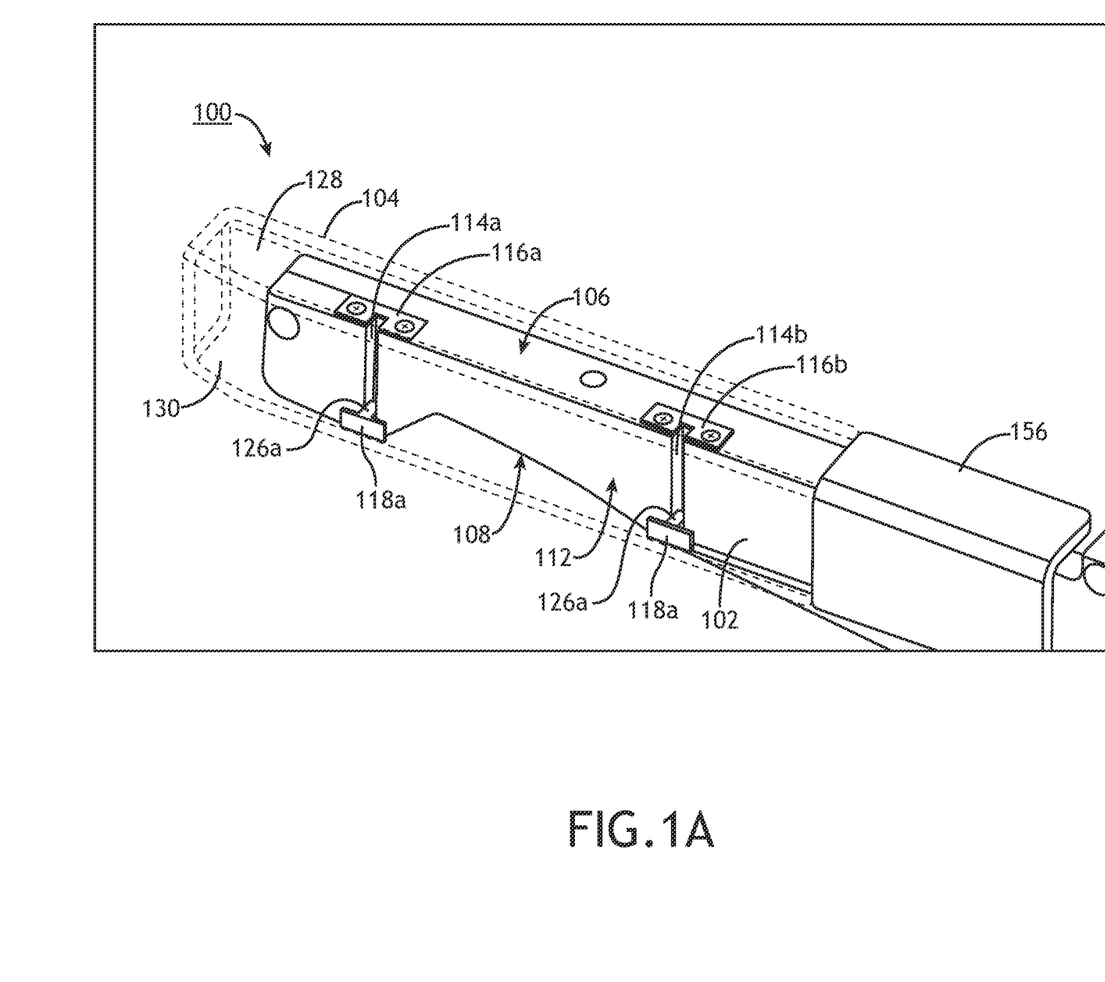
FIG. 1A is a perspective view of the outboard side of an armrest assembly in accordance with an exemplary embodiment of the present disclosure.
Figure 1B:
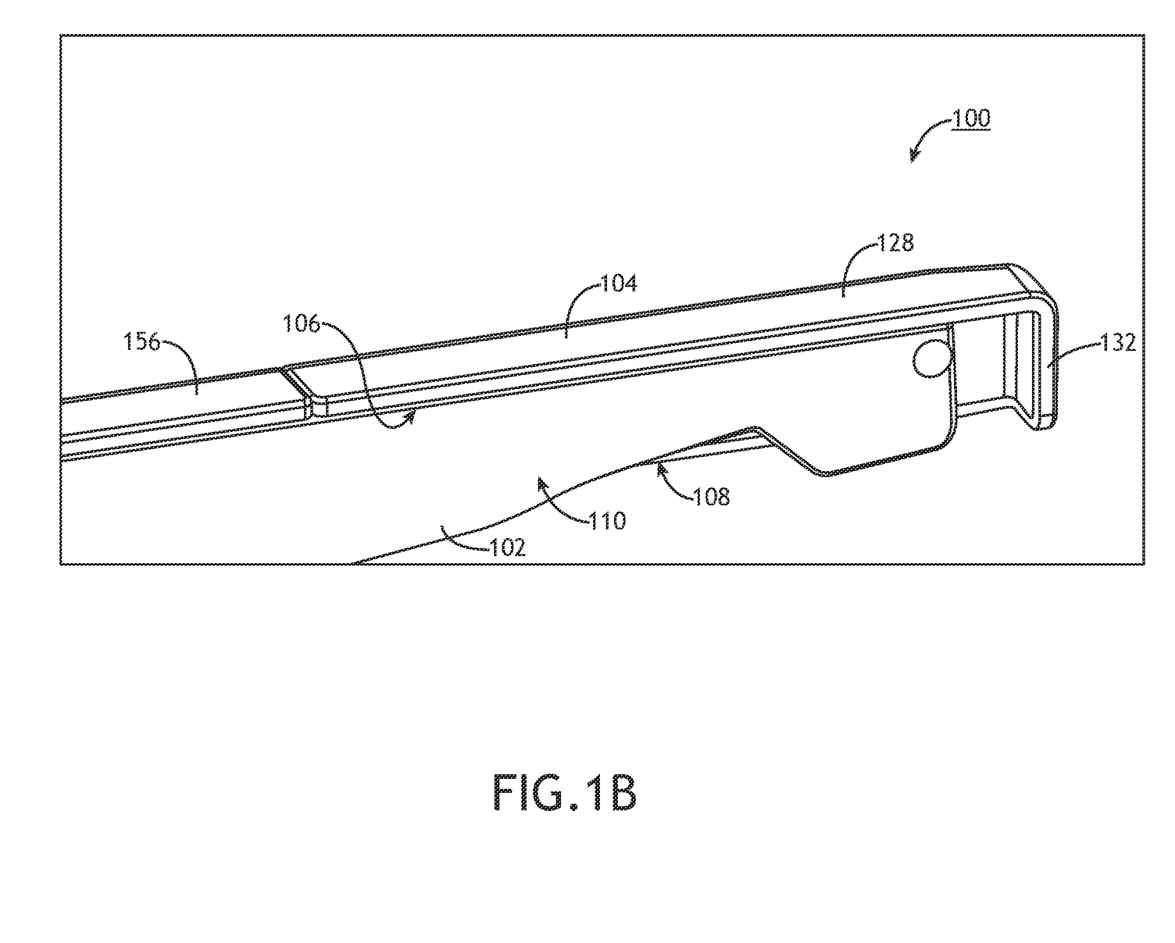
FIG. 1B is a perspective view of the inboard side of the armrest assembly of FIG. 1A.
Figure 1C:
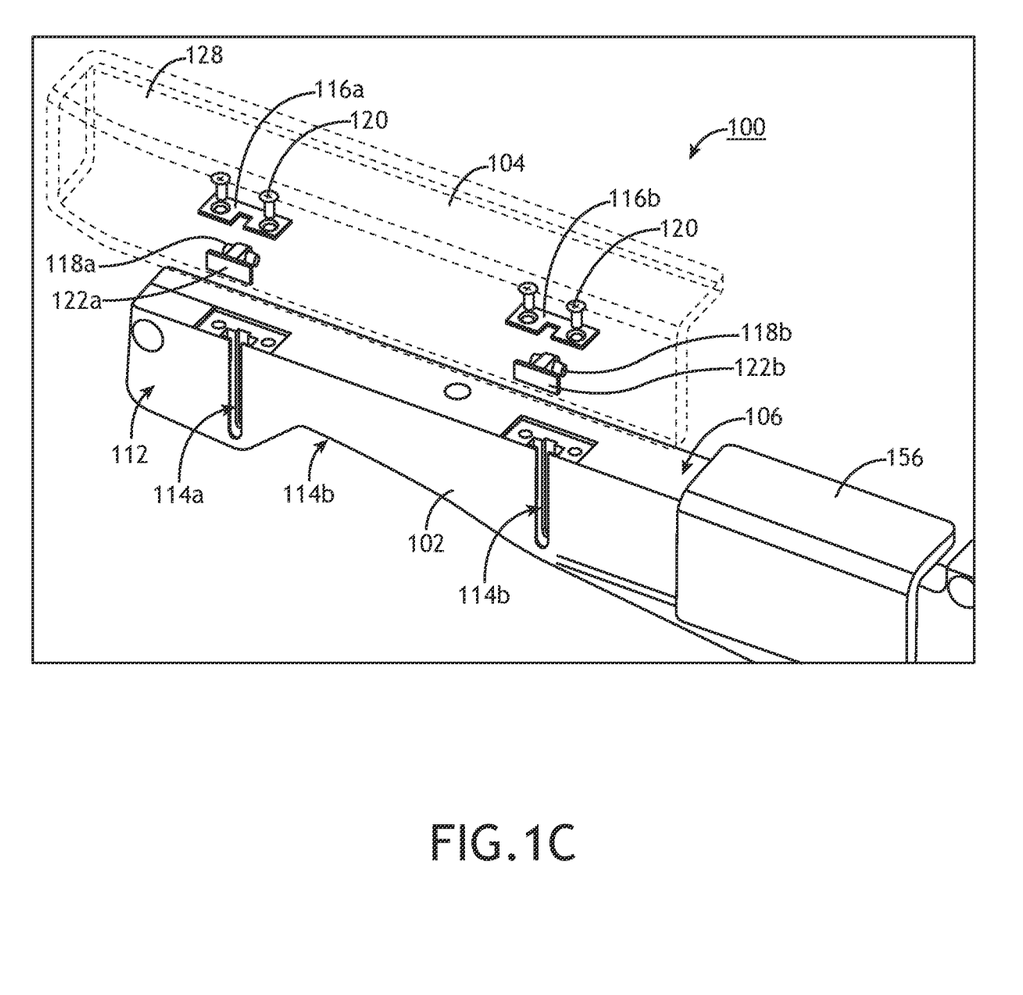
FIG. 1C is a perspective of the armrest assembly of FIG. 1A shown partially deconstructed.
Figure 1D:
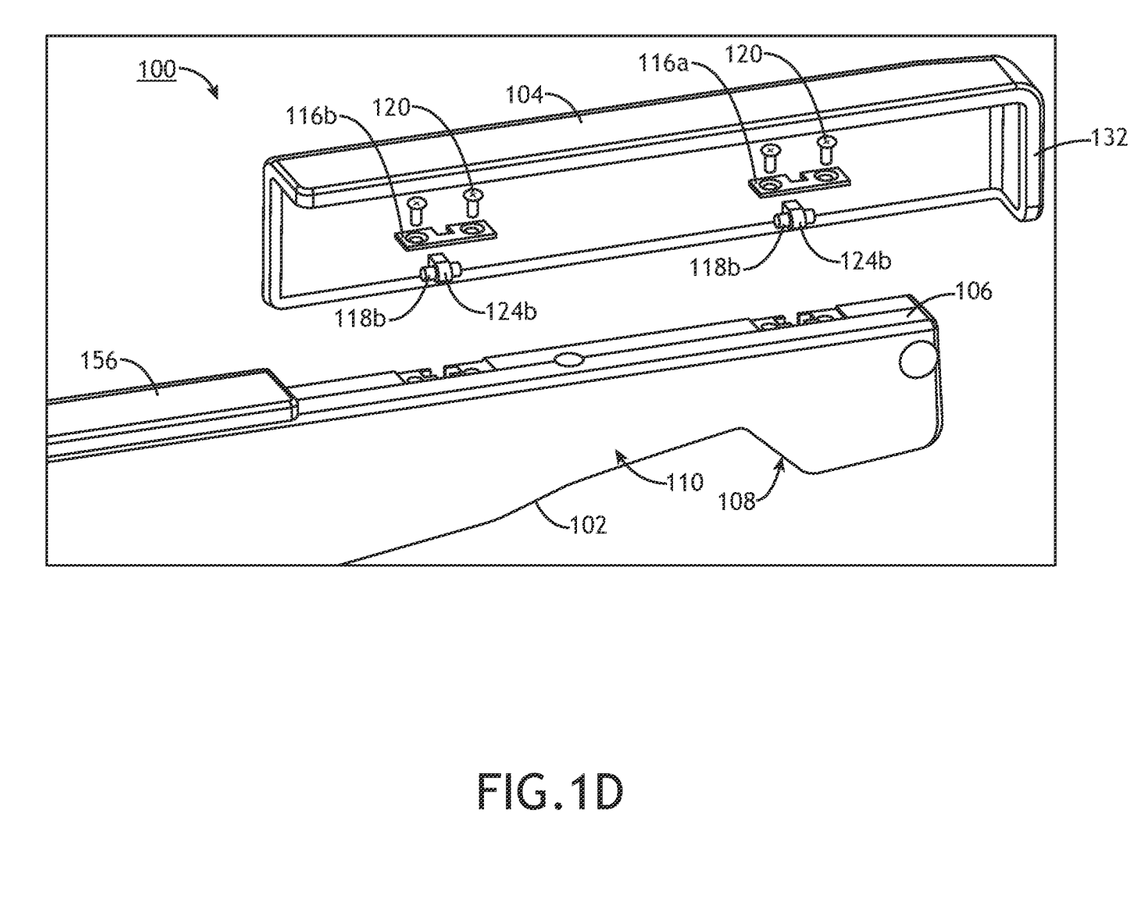
FIG. 1D is a perspective view of the armrest assembly of FIG. 1B shown partially deconstructed.
Figure 2A:
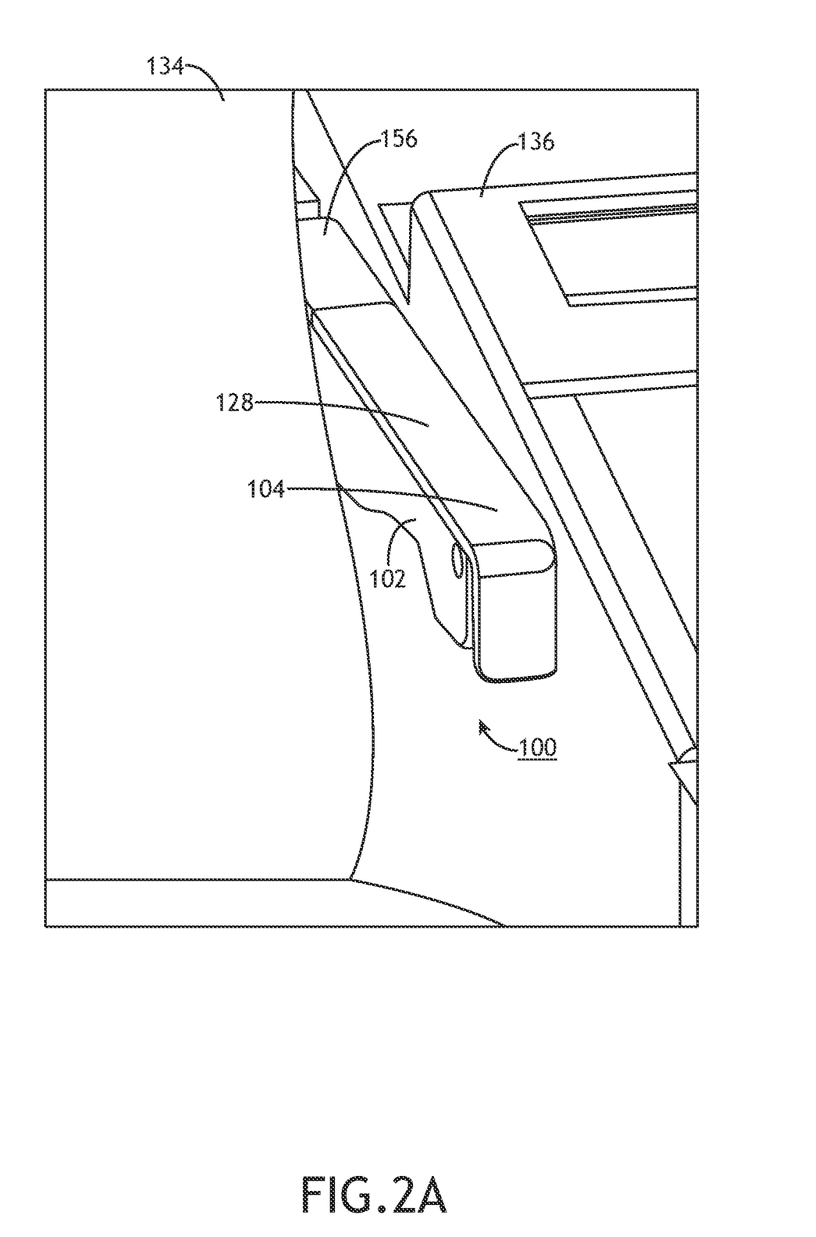
FIG. 2A is a fragmentary perspective view of a cockpit showing the armrest assembly deployed and the arm pad in a first position.
Figure 2B:
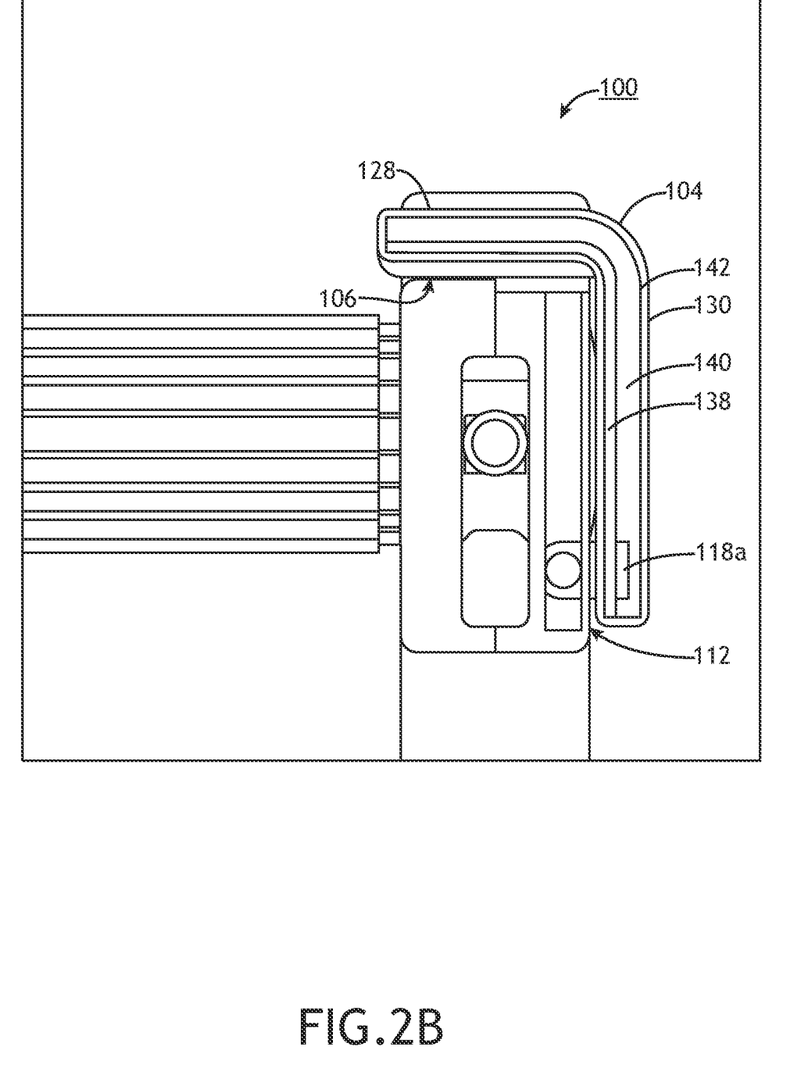
FIG. 2B is a cross-sectional view through the width of the armrest assembly showing the arm pad in the first position.

In some embodiments, the arm pad 104 includes a rigid structural base layer 138 (e.g., metal), a cushion layer 140 positioned atop the rigid structural base layer 138, and a wrapping layer 142 covering the cushion layer 140 (e.g., leather or fabric). Other arm pad constructions are possible and envisioned. In some embodiments, the guide 118a may attach to the rigid structural base layer 138 of the second side 130 proximate the lateral edge of the second side apart from the first side to allow sufficient vertical travel of the arm pad in order to reposition the arm pad first and second sides as discussed further below.

Figure 2C:
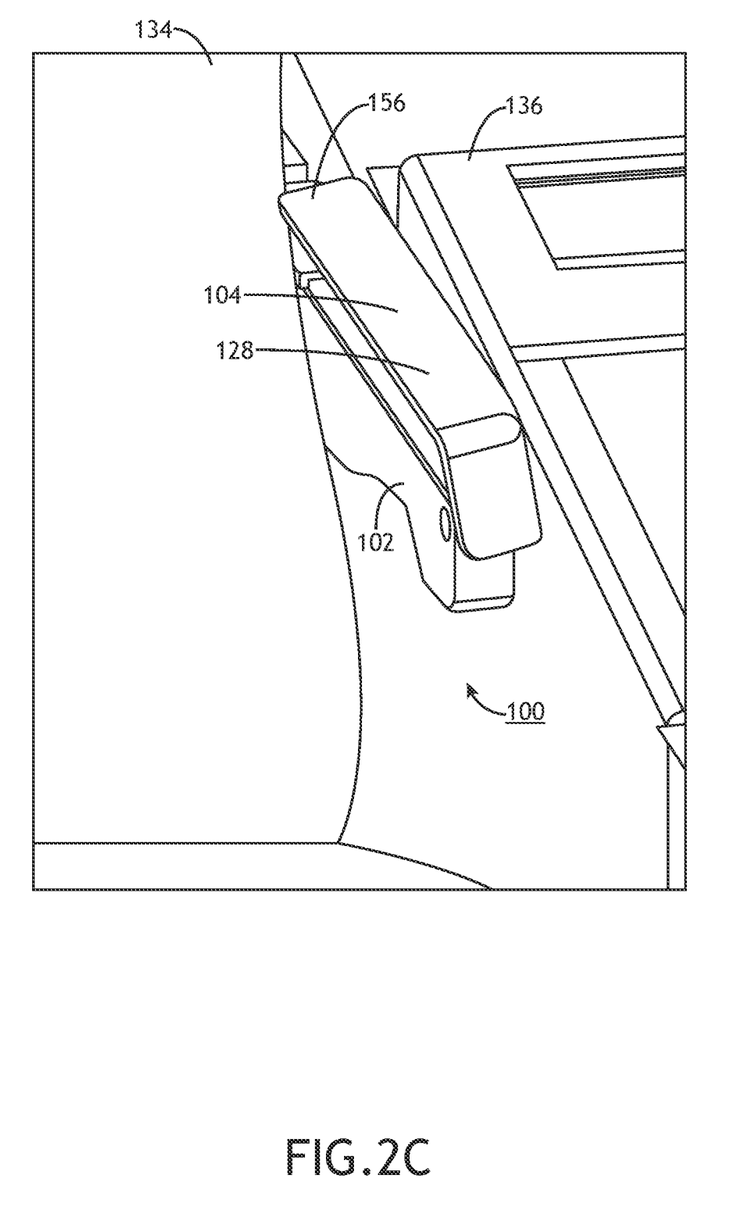
FIG. 2C is a fragmentary perspective view of the cockpit showing the armrest assembly deployed and the arm pad in an intermediate position between the first position and the second position of the arm pad.
Figure 2D:
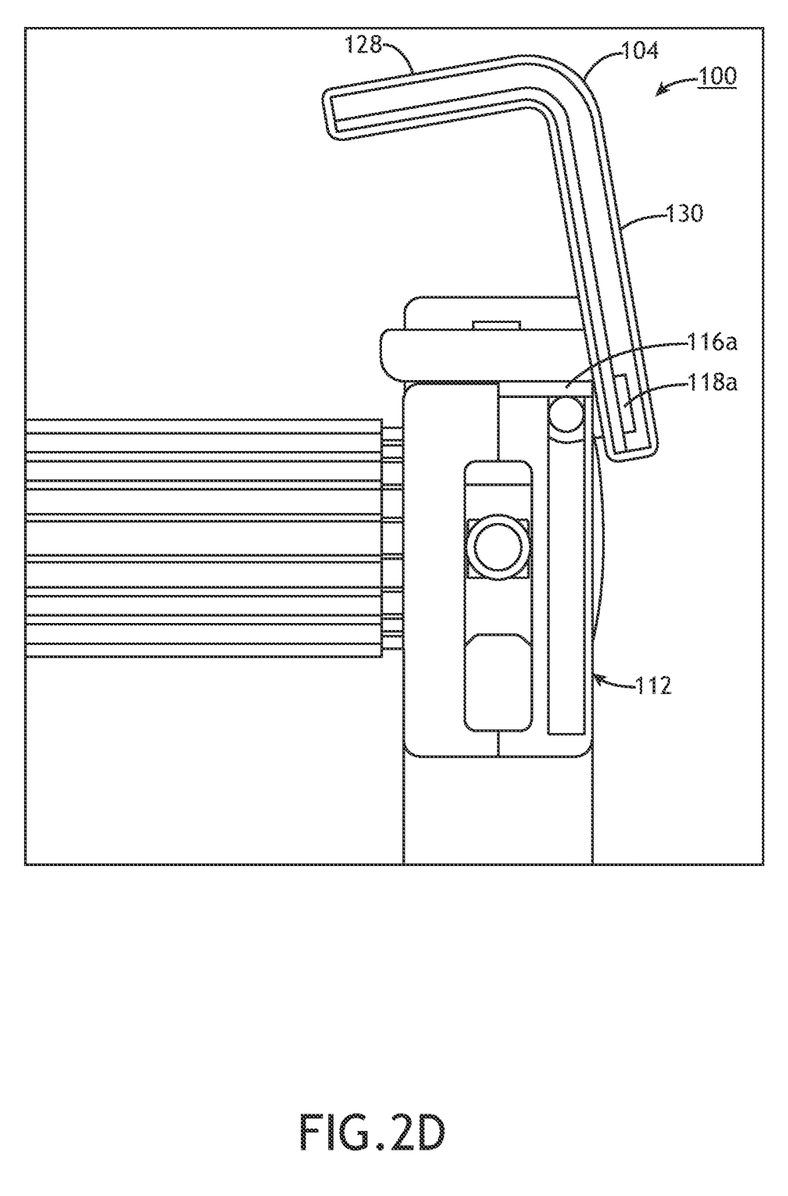
FIG. 2D is a cross-sectional view through the width of the armrest assembly showing the arm pad in the intermediate position between the first position and the second position of the arm pad.
Figure 2E:
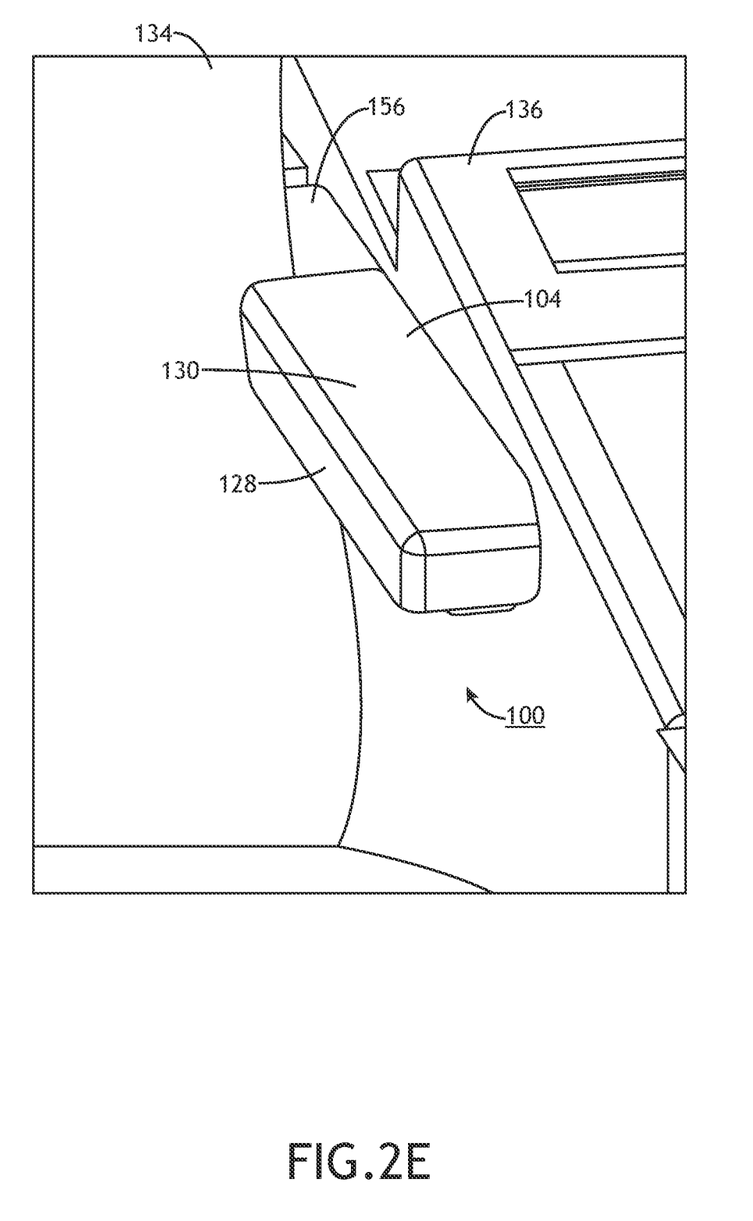
FIG. 2E is a fragmentary perspective view of a cockpit showing the armrest assembly deployed and the arm pad in a second position.
Figure 2F:
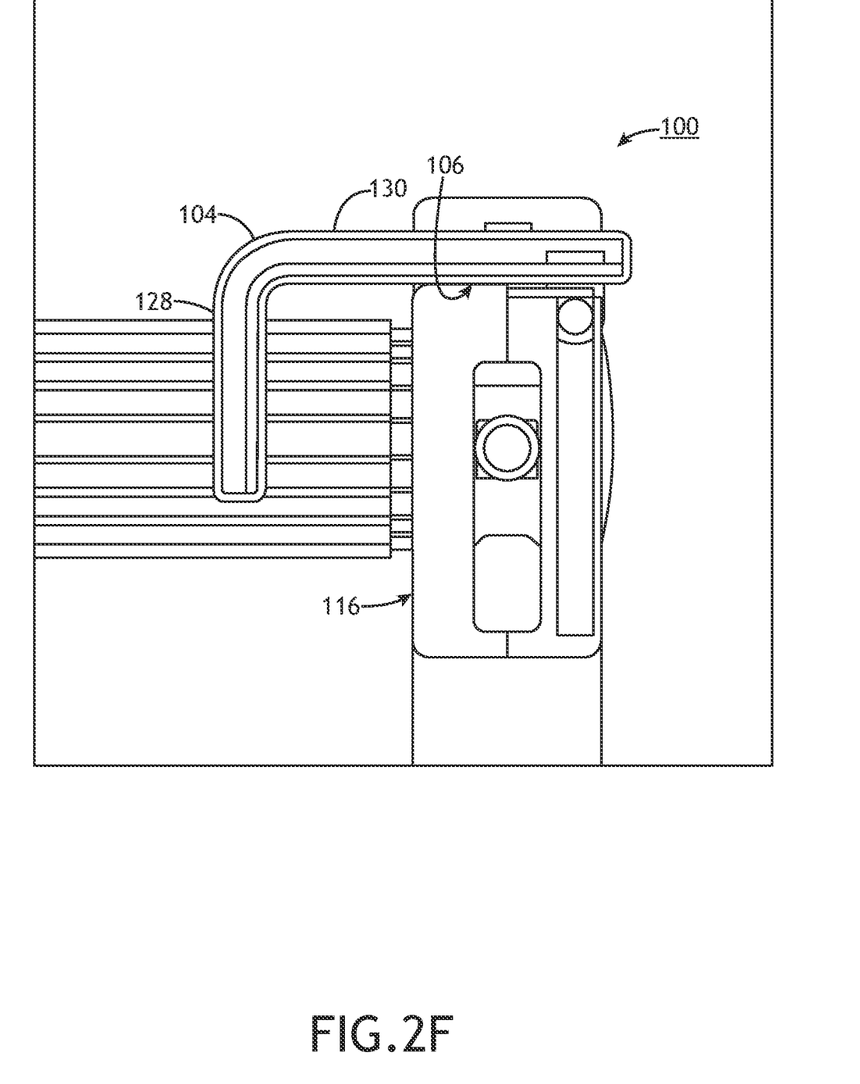
FIG. 2F is a cross-sectional view through the width of the armrest assembly showing the arm pad in the second position.

With specific reference to FIGS. 2C and 2D, the arm pad 104 is shown in a transitional or intermediate position between the first position (FIGS. 2A and 2B) and the second position (FIGS. 2E and 2F). The arm pad 104 translates vertically upward, for instance by manual lifting, from the first position to the transitional position. In some embodiments, the transitional position may correspond to a change from translation motion to rotational motion or vice versa. The arm pad 104 is lifted until the guides 118a reach their stopping point upon contact with their respective guide keeper 116a. At the upper extent of vertical travel, the arm pad 104 resides at a vertical position in which the second side 130 is substantially above and therefore clear of the armrest outboard side 112 such that the arm pad 104 can be rotated approximately 90 degrees to reposition the arm pad 104 relative to the armrest 102.

With specific reference to FIGS. 2E and 2F, arm pad 104 rotation continues until the second side 130 comes into surface contact with the armrest top 106. In the second position, the second side 130 resides horizontally atop the armrest 102 and the first side 128 is positioned alongside the armrest inboard side 110 in spaced apart relation thereto, and vertical. Comparing FIG. 2F and FIG. 2B, it can be seen that the spacing between the vertically positioned first arm pad side 128 and the armrest inboard side 110 in FIG. 2F is greater than the spacing between the vertically positioned second side 130 and the armrest outboard side 112 in FIG. 2B as a result of the wider width of the arm pad second side 130 as compared to the arm pad first side 128. This width difference between the two arm pad sides provides a compact arm pad stowed condition and ergonomic deployed arm pad condition. The surface contact area between the arm pad second side 130 and the armrest top 106 stably supports the cantilevered arm pad position shown in FIGS. 2E and 2F.

Movement of the arm pad 104 from the first position to the second position requires upward vertical translation arm pad motion followed by inboard rotational arm pad motion, in sequential order. Movement of the arm pad 104 from the second position to the first position requires outboard rotational arm pad motion followed by downward vertical translation arm pad motion, in sequential order. Translational and rotational motions may be combined motions as the guides 118a, 118b approach and depart their point of contact with their guide keeper 116a, 116b. Arm pad movement may be purely manual, assisted, automated, or combinations thereof.

With reference to FIGS. 2A, 2C and 2E, in a non-limiting example the armrest assembly 100 according to the present disclosure can be implemented in a vehicle, for instance in an aircraft cockpit a portion of which is shown, generally including a pilot seat 134 positioned between two consoles such as an inboard console and an outboard console 136. In some embodiments, the pilot seat 134 may include like right and left armrest assemblies 100 as described herein symmetrically arranged on the respective right and left sides of the seat 134. Each armrest assembly 100 may be attached to a rotating axle rotatably coupled to the backrest to allow each armrest assembly 100 to pivot, together or independently, relative to the backrest between a stowed condition and a deployed condition. In some embodiments, each armrest assembly 100 stows generally vertically in a recess formed in the backrest, deploys by moving laterally outward with respect to the backrest, and finally rotates to a generally horizontal condition corresponding to the deployed condition. Stowing the armrest assembly 100 requires the reverse motion. In some embodiments, the armrest assembly 100 may further include a fixed arm pad 156 positioned along the armrest 102 rearward of the repositionable arm pad 104. The fixed arm pad 156 is separate from the repositionable arm pad 104 and extends the total arm pad length. The fixed arm pad is immovable relative to the armrest 102 so as not to interfere with the backrest, and also completes the armrest assembly aesthetics.

The armrest assemblies described herein are beneficial for any vehicle seat having a narrow armrest passage requiring an armrest to be thin during stowing and deployment, but can become widened when in use. Particular examples of vehicle seats benefitting from the armrest assemblies described herein are pilot seats positioned within tight quarters in a cockpit.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A vehicle seat armrest assembly, comprising:
    an armrest having a top, a bottom, an inboard side, an outboard side, and spaced first and second guide tracks provided along the outboard side;
    first and second guides slidably engaged in the respective first and second guide tracks; and
    an arm pad attached to the first and second guides, the arm pad having contiguous first and second sides, wherein the arm pad is repositionable relative to the armrest between a first position in which the first side is positioned on the top of the armrest and the second side is positioned alongside the outboard side of the armrest, and a second position in which the first side is positioned alongside the inboard side of the armrest and the second side is positioned on the top of the armrest.

2. The vehicle seat armrest assembly according to claim 1, wherein the contiguous first and second sides of the arm pad form an angle of approximately 90 degrees.

3. The vehicle seat armrest assembly according to claim 1, wherein a width of the second side of the arm pad is greater than a width of the first side of the arm pad.

4. The vehicle seat armrest assembly according to claim 1, wherein each of the first and second guide tracks is formed in the outboard side of the armrest, is linear, and has a length approximately equal to a height of the armrest.

5. The vehicle seat armrest assembly according to claim 1, further comprising a first guide keeper positioned at an upper end of the first guide track to retain the first guide in the first guide track, and a second guide keeper positioned at an upper end of the second guide track to retain the second guide in the second guide track, each of the first and second guide keepers allowing their respective retained one of the first and second guides to rotate within its respective one of the first and second guide tracks when positioned at the upper end of their respective one of the first and second guide tracks.

6. The vehicle seat armrest assembly according to claim 1, wherein;
    each of the first and second guides comprises a first end attached to an inner face of the second side of the arm pad, a second end comprising a bar slidable along a length of the respective one of the first and second guide tracks, and a middle portion extending through a face of the outboard side of the armrest;
    each of the first and second guides is translatable along a length of their respective one of the first and second guide tracks; and
    each of the first and second guides is rotatable within their respective one of the first and second guide tracks when positioned at an upper end of their respective one of the first and second guide tracks.

7. The vehicle seat armrest assembly according to claim 1, wherein:
    movement of the arm pad from the first position to the second position requires arm pad vertical translation flowed by rotation in sequential order; and
    movement of the arm pad from the second position to the first position requires arm pad rotation followed by vertical translation in sequential order.

8. The vehicle seat armrest assembly according to claim 1, wherein the contiguous first and second sides of the arm pad are integrally formed, and wherein the arm pad comprises a rigid structural base layer, a cushion layer positioned atop the rigid structural base layer, and a wrapping layer covering the cushion layer.

9. The vehicle seat armrest assembly according to claim 1, further comprising a fixed pad attached to the armrest separate from the arm pad, the fixed pad positioned rearward of the arm pad along a length of the armrest.

10. An aircraft cockpit configuration, comprising:
    a console; and
    a pilot seat positioned to one side of the console, the pilot seat comprising a backrest and an armrest assembly pivotable between a stowed condition alongside the backrest and a deployed condition in a space provided between the pilot seat and the console, the armrest assembly comprising:
        an armrest having a top, a bottom, an inboard side, an outboard side, and spaced first and second guide tracks provided along the outboard side, wherein the inboard side faces the pilot seat and the outboard side faces the console;

first and second guides slidably engaged in the respective first and second guide tracks; and an arm pad attached to the first and second guides, the arm pad having contiguous first and second sides, wherein, when the armrest assembly is in the deployed position, the arm pad is repositionable relative to the armrest between a first position in which the first side is positioned on the top of the armrest and the second side is positioned alongside the outboard side of the armrest, and a second position in which the first side is positioned alongside the inboard side of the armrest and the second side is positioned on the top of the armrest.

11. The aircraft cockpit configuration according to claim 10, wherein:

the contiguous first and second sides of the arm pad form an angle of approximately 90 degrees;

the contiguous first and second sides of the arm pad are integrally formed; and the arm pad comprises a rigid structural base layer, a cushion layer positioned atop the rigid structural base layer, and a wrapping layer covering the cushion layer.

12. The aircraft cockpit configuration according to claim 10, wherein a width of the second side of the arm pad is greater than a width of the first side of the arm pad.

13. The aircraft cockpit configuration according to claim 10, wherein the armrest assembly further comprises a first guide keeper positioned at an upper end of the first guide track to retain the first guide in the first guide track, and a second guide keeper positioned at an upper end of the second guide track to retain the second guide in the second guide track, each of the first and second guide keepers allowing their respective retained one of the first and second guides to rotate within its respective one of the first and second guide tracks when positioned at the upper end of their respective one of the first and second guide tracks.

14. The aircraft cockpit configuration according to claim 10, wherein:

when the arm pad is in the first position the first side of the arm pad is horizontal, the second side of the arm pad is vertical, and the first side of the arm pad rests on the top of the armrest;

when the arm pad is in the second position the first side of the arm pad is vertical, the second side of the arm pad is horizontal, and the second side of the arm pad rests on the top of the armrest;

movement of the arm pad from the first position to the second position requires arm pad vertical translation followed by rotation in sequential order; and movement of the arm pad from the second position to the first position requires arm pad rotation followed by vertical translation in sequential order.

15. The aircraft cockpit configuration according to claim 10, wherein the armrest assembly further comprises a fixed pad separate from the arm pad, wherein the fixed pad is positioned rearward of the arm pad such that the fixed pad is positioned alongside the backrest when the armrest assembly is in the deployed position.

* * * * *